(12) United States Patent
Hopkins et al.

(10) Patent No.: US 7,550,199 B2
(45) Date of Patent: Jun. 23, 2009

(54) COPOLYMERS FOR STAIN RESISTANCE

(75) Inventors: Timothy Edward Hopkins, Wilmington, DE (US); Stephen Ernest Jacobson, Hockessin, DE (US); Melea Rena Langley, Ringgold, GA (US); Peter Michael Murphy, Chadds Ford, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 163 days.

(21) Appl. No.: 11/496,372

(22) Filed: Jul. 31, 2006

(65) Prior Publication Data

US 2008/0022463 A1    Jan. 31, 2008

(51) Int. Cl.
*B32B 27/08* (2006.01)

(52) U.S. Cl. .................. 428/394; 428/375; 428/378; 525/327.4; 525/327.6; 525/331; 525/333.6; 427/385.5; 427/389.9; 427/393.4

(58) Field of Classification Search .......... 525/327.4, 525/327.6, 331, 333.6, 38; 427/385.5, 389.9, 427/393.4; 428/375, 378, 394
See application file for complete search history.

(56) References Cited

U.S. PATENT DOCUMENTS

| 4,256,800 | A | 3/1981 | Stockhausen et al. |
|---|---|---|---|
| 4,883,839 | A | 11/1989 | Fitzgerald et al. |
| 4,948,650 | A | 8/1990 | Fitzgerald et al. |
| 5,001,004 | A | 3/1991 | Fitzgerald et al. |
| 5,032,136 | A | 7/1991 | Fitzgerald et al. |
| 5,057,121 | A | 10/1991 | Fitzgerald et al. |
| 5,346,726 | A | 9/1994 | Pechhold |
| 5,460,887 | A | 10/1995 | Pechhold |
| 5,707,708 | A | 1/1998 | Pechhold |
| 5,708,087 | A | 1/1998 | Buck et al. |
| 5,756,181 | A | 5/1998 | Wang et al. |
| 5,834,088 | A | 11/1998 | Pechhold |
| 6,238,792 | B1 | 5/2001 | Pechhold et al. |

FOREIGN PATENT DOCUMENTS

| GB | 1 504 963 A | 3/1978 |
|---|---|---|
| JP | 62112608 | 5/1987 |
| RU | 373278 | 11/1973 |
| WO | WO 9118932 | 12/1991 |
| WO | WO 9212286 | 7/1992 |
| WO | WO 96/33445 | * 10/1996 |

* cited by examiner

Primary Examiner—Helen L. Pezzuto
(74) Attorney, Agent, or Firm—Nancy S. Mayer

(57) ABSTRACT

A method for imparting resistance to staining to a substrate comprising contacting the substrate with a copolymer comprising the monomers of Formula

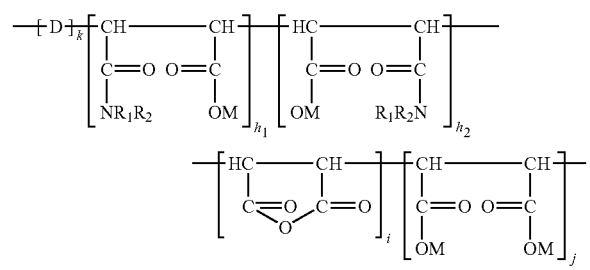

Formula 1 wherein
D is at least one vinyl monomer selected from the group consisting of aryl olefin, alpha olefin and diene,
each M is independently H, Ca, Mg, Al, Na, or K,
each $R_1$ is independently H, $C_1$-$C_6$ alkyl, or $C_1$-$C_6$ hydroxyalkyl,
each $R_2$ is independently linear or branched $C_1$-$C_{12}$ alkyl, $C_1$-$C_6$ hydroxyalkyl, $C_6F_5$, arylalkyl, $C_6H_4OH$, $R_3COOH$, or $R_3SO_3H$,
or $R_1$ and $R_2$ are linked together to form a morpholino or pyrrolidino ring,
$R_3$ is linear or branched $C_1$-$C_{12}$ alkyl, $CH(COOH)$ $CH_2CH_2$, $C_6H_4$, or $C_6H_3(OH)$,
$h_1+h_2$ is h, h is a positive integer,
k is zero or a positive integer,
i and j are each independently zero or a positive integer,
provided that the total of 1) $h \div (k+h+i+j)$ is from about 0.005 to about 0.7, 2) $k \div (k+h+i+j)$ is from about 0.3 to about 0.6, 3) $[i+j] \div (k+h+i+j)$ is 0 to about 0.6, and provided that the sum of 1)+2)+3) is 1.0,
said monomers occurring in any sequence.

9 Claims, No Drawings

COPOLYMERS FOR STAIN RESISTANCE

FIELD OF THE INVENTION

This invention relates to the field of providing stain resistance to fibrous substrates using a copolymer made by the reaction of a primary or secondary amine with an alkene/maleic anhydride copolymer and/or an alpha olefin/maleic anhydride copolymer.

BACKGROUND OF THE INVENTION

Fibrous substrates, such as polyamide carpeting, upholstery fabric, wool and other textiles, are subject to staining by a variety of agents, e.g., foods and beverages. Acid dyes present in such agents are especially troublesome staining agents, e.g., FD&C Red Dye No. 40, commonly found in soft drink preparations. Another common staining problem is caused by coffee. Prior proposals for inhibiting staining of polyamide substrates by acid dyes or coffee include application of sulfonated phenol-formaldehyde condensates, alone or in combination with hydrolyzed maleic anhydride polymers or polymers of methacrylic acid, acrylic acid, or itaconic acid, or combinations of the same.

U.S. Pat. Nos. 5,707,708 and 5,834,088 of Pechhold disclose the usefulness of 1-alkene/maleic anhydride copolymers having between about 0.4 and 1.3 polymer units derived from the 1-alkene per unit derived from maleic anhydride, the 1-alkene content of said copolymer comprising between (a) 100 and 80 mol % of an 1-alkene containing 4 to 12 carbon atoms and (b) 0 to 20 mol% of at least one 1-alkene containing 3 or 14 to 24 carbon atoms.

In an unrelated field of study, JP 62112608 discloses the use of styrene/maleic anhydride copolymers modified by reaction with p-aminosalicylic acid and triethylamine for coating the dentine surfaces of teeth. It does not disclose or suggest the use of such compositions for stain resistance on textiles or other fibrous substrates.

There is a need for improved methods of providing stain resistance to fibrous substrates, in particular for acid dye and coffee stains. The present invention provides such a method.

SUMMARY OF THE INVENTION

The present invention comprises a method for imparting resistance to staining to a substrate comprising contacting said substrate with a copolymer comprising the monomers of Formula I wherein D is at least one vinyl monomer selected from the group consisting of aryl olefin, alpha olefin and diene, each M is independently H, Ca, Mg, Al, Na, or K, each $R_1$ is independently H, $C_1$-$C_6$ alkyl, or $C_1$-$C_6$ hydroxyalkyl, each $R_2$ is independently linear or branched $C_1$-$C_{12}$ alkyl, $C_1$-$C_6$ hydroxyalkyl, $C_6F_5$, arylalkyl, $C_6H_4OH$, $R_3COOH$, or $R_3SO_3H$, or $R_1$ and $R_2$ are linked together to form a morpholino or pyrrolidino ring, $R_3$ is linear or branched $C_1$-$C_{12}$ alkyl, CH(COOH)CH$_2$CH$_2$, $C_6H_4$, or $C_6H_3(OH)$, $h_1$+$h_2$ is h, h is a positive integer, k is zero or a positive integer, i and j are each independently zero or a positive integer, provided that the total of 1) h÷(k+h+i+j) is from about 0.005 to about 0.7, 2) k÷(k+h+i+j) is from about 0.3 to about 0.6, 3) [i+j]÷(k+h+i+j) is 0 to about 0.6, and provided that the sum of 1)+2)+3) is 1.0, said monomers occurring in any sequence.

The present invention further comprises a substrate to which has been applied a composition of Formula 1 as described above.

DETAILED DESCRIPTION

Herein trade names are shown in upper case.

The present invention comprises a method for imparting resistance to staining to a substrate comprising contacting said substrate with a copolymer comprising the monomers of Formula I

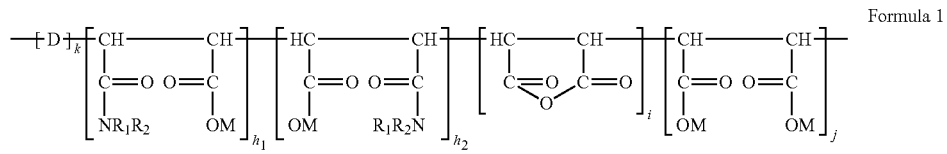

Formula 1

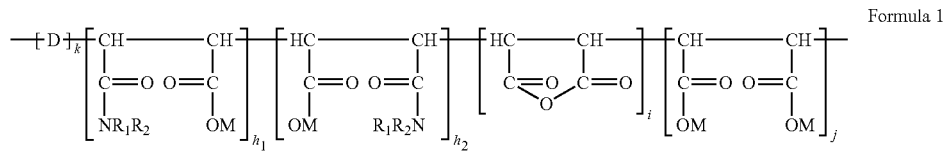

Formula 1 wherein

D is at least one vinyl monomer selected from the group consisting of aryl olefin, vinyl ether, allyl ether, alpha olefin and diene, each M is independently H, Ca, Mg, Al, Na, or K, each $R_1$ is independently H, $C_1$-$C_6$ alkyl, or $C_1$-$C_6$ hydroxyalkyl, each $R_2$ is independently linear or branched $C_1$-$C_{12}$ alkyl, $C_1$-$C_6$ hydroxyalkyl, $C_6F_5$, arylalkyl, $C_6H_4OH$, $R_3COOH$, or $R_3SO_3H$, or $R_1$ and $R_2$ are linked together to form a morpholino or pyrrolidino ring, $R_3$ is linear or branched $C_1$-$C_{12}$ alkyl, CH(COOH)$CH_2CH_2$, $C_6H_4$, or $C_6H_3$(OH), $h_1$+$h_2$ is h, h is a positive integer, k is zero or a positive integer, i and j are each independently zero or a positive integer, provided that the total of 1) h÷(k+h+i+j) is from about 0.005 to about 0.7, 2) k÷(k+h+i+j) is from about 0.3 to about 0.6, 3) [i+j]÷(k+h+i+j) is 0 to about 0.6, and provided that the sum of the three ratios 1) h÷(k+h+i+j) plus 2) k÷(k+h+i+j) plus 3)[i+j]÷(k+h+i+j) is 1.0, said monomers occurring in any sequence.

The sum of the above three ratios is 100%. The ratio is converted to percentage by multiplying by 100. The ratio of h÷(k+h+i+j) is present at from about 0.005 to about 0.7 (0.5% to about 70%), preferably from about 0.1 to about 0.5 (about 10% to about 50%). The ratio k÷(k+h+i+j) is present at from about 0.3 to about 0.6 (about 30% to about 60%), preferably from about 0.4 to about 0.5 (about 40% to about 50%). The ratio of (i+j)÷(k+h+i+j) is present at from 0 to about 0.6 (0% to about 60%), preferably from about 0 to about 0.5 (0% to about 50%).

The sum (h+k+i+j) is sufficient to provide a copolymer molecular weight of at least 800, preferably at least 1000, and more preferably at least 4000. Formula 1 is the reaction product of a maleic anhydride copolymer stain resist precursor with at least one primary or secondary amine.

Formula 1 is schematic of the copolymer and indicates the monomers but not the sequence of monomers in the chain. The monomers can be in any sequence.

For Formula 1 group M is independently H, Na, K, Ca, Mg, Al, or other cation. Preferably M is H, Na, or K.

For Formula 1, group D is an aryl olefin, alpha olefin, or diene. A preferred example of an aryl olefin is styrene. A preferred example of an alpha-olefin is 1-octene, and a preferred example of a diene is 1,3-butadiene.

For Formula 1, $R_2$ is preferably $C_6F_5$, $(CH_2)_mC_6H_5$, $(CH_2)_nSO_3H$, $C_6H_4SO_3H$, $CH(CH_3)CH_2CH_3$, or $R_3COOH$.

Formula 1 copolymers are prepared by the reaction of a maleic anhydride copolymer with at least one primary or secondary amine. The maleic anhydride copolymers useful in the preparation of the copolymers of Formula 1 are copolymers of at least one vinyl monomer and maleic anhydride, and are well known by those skilled in the art. These maleic anhydride copolymers have the general structure of Formula 1 having h equal to zero. Examples of such copolymers are described together with methods for their preparation, for instance, by Fitzgerald et al. in U.S. Pat. No. 4,883,839 and Pechhold in U.S. Pat. Nos. 5,346,726 and 5,707,708. Other methods for preparation of the Formula 1 copolymers include solvent-free microwave-heated reaction, in an autoclave under high pressure conditions, and by melt extrusion.

For example, the copolymers used in the present invention are prepared by contacting an amino-hydroxyaromatic acid with a copolymer of maleic anhydride and styrene, or a copolymer of maleic anhydride and 1-alkene. Preferably the amino-hydroxyaromatic acid is selected from the group consisting of amino-hydroxybenzenecarboxylic acids and amino-hydroxybenzenesulfonic acids. More preferably the amino-hydroxybenzenecarboxylic acid is 4-aminosalicylic acid, and the amino-hydroxybenzenesulfonic acid is 3-amino-4-hydroxybenzenesulfonic acid.

The maleic anhydride/styrene copolymers useful in the current invention are prepared by methods known in the art, or can be purchased from Sigma Aldrich. The maleic anhydride/1-alkene copolymers can also be prepared by methods described in U.S. Pat. Nos. 5,707,708 and 5,834,088.

The maleic anhydride copolymer is reacted with the amine in a solvent solution with about a 20% molar excess of alkylamine, preferably triethylamine, relative to the amine. The ratio of the amine, preferably amino-hydroxyaromatic acid, to the maleic anhydride copolymer is varied from about 0.01 to about 1.0 mols per mol, preferably between about 0.05 and about 0.3 mols per mol. Preferably the solvent is acetone. The mixture is heated under reflux for approximately 3 hours. It is then heated under conditions to remove the solvent and produce an aqueous solution of a modified maleic anhydride copolymer.

The modified maleic anhydride polymer is then hydrolyzed to the free acid or its salts by reaction with water, an alkali, or an alcohol, according to methods known in the art. Generally, the hydrolyzed maleic anhydride polymer is sufficiently water-soluble that uniform application to a fibrous surface, such as a polyamide, can be achieved at an appropriate acidity. However, applications using water dispersions of the polymer mixed with a suitable surfactant can also be used to impart stain resistance. The molecular weight of polymer useful in this invention does not appear to be a limitation so long as the polymers are water-soluble or water-dispersible.

As an example of the above hydrolyzation step, approximately 2 molar equivalents of sodium hydroxide relative to the modified maleic anhydride copolymer is added in an approximately 20% aqueous solution, and the resulting mixture is then heated for about 3 hours at 70° C. The solution is then acidified and filtered to yield a powder containing the desired product. This powder is then dissolved in basic water by refluxing to yield a solution for testing as a stain-resist. It is to be recognized that many variations in this procedure are acceptable, and can be made by those skilled in the art.

Optionally, one can blend the stain-resists of the current invention with other known stain-resists, such as phenol-formaldehyde condensation products, methacrylic acid polymers; or hydrolyzed polymers of maleic anhydride and one or more ethylenically unsaturated aromatic compounds.

In the method of the present invention of providing stain resistance to substrates the copolymers are used as such in treating fibrous substrates. They are effectively applied to fibrous substrates by a wide variety of methods known to those skilled in the art, such as: padding, spraying, foaming in conjunction with foaming agents, batch exhaust in beck dyeing equipment, or continuous exhaust during a continuous dyeing operation. They are applied by such methods to dyed or undyed polyamide textile substrates. In addition, they are applied to such substrates in the absence or presence of polyfluoroorganic oil-, water-, and/or soil- repellent materials. In the alternative, such a polyfluoroorganic material is applied to the textile substrate before or after application of the copolymers of this invention thereto.

The quantities of the copolymers which are applied to the fibrous substrate are amounts effective in imparting stain-resistance to the substrate. Those amounts can be varied widely; in general, one can use between about 1% and about 5% by weight of them based on the weight of the substrate, usually about 2.5% by weight or less. The polymers are applied, as is common in the art, at a pH ranging between about 2 and about 7. However, more effective exhaust deposition is obtained at a pH as low as 1.5. When the latter low pH is used, the preferred level of application to the substrate is about 2.5% by weight, based on the weight of the substrate. In one embodiment, a pH between about 2 and 3 is used. More effective stainblocking is obtained if the polymers are applied to the textile substrate at either 20° C. followed by heat treatment at a temperature in the range between about 50° C. and about 150° C. for about 1 to about 60 minutes, or applied at temperatures in the range between about 40° C. and about 95° C. for about 1 to about 60 minutes. For example, at a pH between about 2 and about 3, a temperature between about 70° C. and about 90° C. is preferred. However, stain-blocking is obtained when application is effected even at the temperature of cold tap water (10° C.-15° C.).

The copolymers are also applied in-place to carpeting which has already been installed in a dwelling place, office or other locale. They are applied as a simple aqueous preparation or in the form of aqueous shampoo preparation, with or without one or more polyfluoroorganic oil-, water-, and/or soil-repellent materials. They are applied at the levels described above, at temperatures described, and at a pH between about 1 and about 12, preferably between about 2 and about 9.

Other treatment aids that are known to those skilled in the art can be added to the copolymers used in the method of the present invention including additional components such as treating agents or finishes to achieve additional surface effects, or additives commonly used with such agents or finishes. Such additional components comprise compounds or compositions that provide surface effects such as no iron, easy to iron, shrinkage control, wrinkle free, permanent press, moisture control, softness, strength, anti-slip, anti-static, anti-snag, anti-pill, stain repellency, stain release, soil repellency, soil release, water repellency, oil repellency, odor control, antimicrobial, sun protection, and similar effects. One or more such treating agents or finishes can be combined with the aqueous solution or dispersion of Formula 1 and applied to the fibrous substrate. Other additives commonly used with such treating agents or finishes can also be present such as surfactants, blocked isocyanates, pH adjusters, cross linkers, wetting agents, hydrocarbon extenders, wax extenders, and other additives known by those skilled in the art. Suitable surfactants include anionic, cationic, and nonionic. Preferred is an anionic surfactant such as sodium lauryl sulfonate, available as DUPONOL WAQE from Witco Corporation, Greenwich, Conn.

In a further embodiment, the present invention comprises substrates treated with at least one copolymer using the method of the present invention. Substrates suitable for use in the present invention comprise fibrous substrates and include fibers, yarns, fabrics, textiles, nonwovens, carpets, leather, or paper. The fibrous substrates are made with natural fibers such as wool, cotton, jute, sisal, sea grass, paper, coir and cellulose, or mixtures thereof; or are made with synthetic fibers such as polyamides, polyesters, polyolefins, polyaramids, acrylics and blends thereof; or blends of at least one natural fiber and at least one synthetic fiber. By "fabrics" is meant natural or synthetic fabrics, or blends thereof, composed of fibers such as cotton, rayon, silk, wool, polyester, polypropylene, polyolefins, nylon, and aramids such as "NOMEX" and "KEVLAR." By "fabric blends" is meant fabric made of two or more types of fibers. Typically these blends are a combination of at least one natural fiber and at least one synthetic fiber, but also can be a blend of two or more natural fibers or of two or more synthetic fibers. Preferably carpet substrates are scoured, meaning that finishing oils have been removed from the surface of the fiber by washing, rinsing or dyeing, prior to treatment with Formula 1.

Substrates so treated were superior to untreated products in blocking coffee and red dyes such as KOOL-AID. The superior stain resistance provided by the method and treated substrates of the present invention provide several advantages. For example, the superior resistance to coffee and red dye is advantageous in use of the treated substrates in fabrics and textiles used in garments, home furnishings, carpets, and other consumer products.

Methods

The following methods and materials were used in the Examples herein.

Test Method 1—Stain Test with Cherry KOOL-AID

Cherry KOOL-AID stain testing was conducted on carpet samples 15 cm by 15 cm. Acid dye stain resistance was evaluated using a procedure based on the American Association of Textile Chemists and Colorists (AATCC) Method 175, "Stain Resistance: Pile Floor Coverings." A staining solution was prepared by mixing 36.5 grams of sugar sweetened cherry KOOL-AID and 500 mL water. KOOL-AID is a trademark of Kraft General Foods, Inc. The carpet sample to be tested was placed on a flat non-absorbent surface and a hollow plastic cylinder having a 2-inch (5-cm) diameter was placed tightly over the carpet sample. Twenty mL of KOOL-AID staining solution was poured into the cylinder which was on the carpet sample. The stain was then gently worked into the carpet. The cylinder was then removed and the stained carpet sample was allowed to sit undisturbed for 24 hours. Then the carpets were rinsed thoroughly under cold tap water for at least 10 minutes until the rinse water was clear. The carpet samples were extracted, and air-dried for 24 hours on a non-absorbent surface.

KOOL-AID stains were rated with a visual stain rating scale (MTCC Red 40 Stain Scale) from MTCC Test Method 175. A visual rating of 10 (complete stain removal) to 1 (maximum or unchanged stain) was obtained by using the AATCC Red 40 Stain Scale (Test Method #175) with the KOOL-AID stains having the same discoloration as the numbered colored film.

Test Method 2—Coffee Stain Test

Carpet samples, 6.76×6.76-inch (17.2×17.2 cm) squares of dyed carpet, were cut and placed pile side up on a non-absorbent surface. The pile was cleaned of any unattached materials by vacuuming. ORIGINAL MAXWELL HOUSE ground coffee (33.8 g), available from Maxwell House Coffee Co., Tarrytown N.Y., was placed into a standard 10-cup coffee filter. Deionized water (1266.2 g) was added and the coffee brewed according to the manufacturers' directions. The pH of the coffee was adjusted to 5.0 using aqueous solutions containing either 30% aqueous sodium hydrogen sulfate or 10% sodium hydroxide as needed. The coffee was poured into a suitable volumetric dispenser, capable of dispensing 50 mL portions and the dispenser placed in a hot water bath at 62° C. The coffee was allowed to come to a temperature of 140° F.±5° F. (60°±2.8° C.) and remain at that temperature for 30±5 minutes prior to staining. A ring, in the shape of an open-ended cylinder was used, having a diameter of a smaller opening of 2.75 inch (7 cm). Such a ring is described for a different purpose in AATCC Test Method 175. The ring was placed at the center of the carpet sample, with the smaller diameter opening against the pile. The coffee dispenser was set to measure 50 mL, and purged once prior to staining. With the ring pressed down into the pile, 50 mL of coffee was transferred into a container and immediately poured into the ring and onto the carpet. The coffee was worked into the carpet evenly and thoroughly with the base of the cup. The coffee was allowed to stain the carpet for 4 hours±20 minutes. Then the carpet samples were thoroughly rinsed in cold water for at least 10 minutes until the rinse water was clear. The carpet samples were extracted, and air-dried for 24 hours on a non-absorbent surface.

Coffee stains were rated using a delta E color difference measurement. The color of each control and test carpet was measured both before and after the coffee stain test. The initial color of the carpet (L*, a*, b*) was measured on an unstained piece of carpet. The delta E is the difference between the color of the unstained and stained samples, expressed as a positive number. The color difference was measured using a Minolta Chroma Meter CR-410. Color readings were taken on several areas on the carpet sample, and the average delta E was reported. Control carpets were of the same color and construction as the carpets for test items. A delta E reading of zero represents no color difference between two samples. A larger delta E value indicates a color difference between two samples. Color measurement with delta E is discussed in AATCC Evaluation Procedure 7, "Instrumental Assessment of the Change in Color of a Test Specimen".

The calorimetric delta E values from the coffee stain resist test on a sample and control was used to calculate the "Percent Coffee Blocked". The percent blocking of the stain is calculated as:

$$100(\text{Delta } E_{untreated} - \text{Delta } E_{treated})/\text{Delta } E_{untreated}.$$

Higher values denote better stain blocking.

Materials

All chemicals employed in the Examples herein were purchased from Aldrich Chemical, Milwaukee, Wis. except where stated otherwise.

The carpet material used in the following examples was a residential cut pile two ply 1150, 3.5 turns per square inch (0.06 cm$^2$), 5/32 gauge, pile height 0.5 in. (1.3 cm), 30 oz per square yard (1.0 kg/m$^2$), dyed either beige or light blue and available from Invista, Wilmington, Del.

Application Method

Dyed and unbacked 1150 denier two ply, heatset residential carpet (either light blue or beige color) was cut into approximately 4 inch×4 inch squares (approximately 10 cm×10 cm) and each square weighed as dry carpet samples. The weight was typically about 13 grams per sample. Each carpet sample was saturated with water and then most of the water in the carpet was removed by mechanical means (such as by spin-drying extraction) until the weight of water remaining in the carpeting was about 40% of the dry carpet weight.

Each stainblocker application solution contained 65 grams of deionized water, DOWFAX 2A4 surfactant (0.05 grams) available from Dow Chemical Company, Midland, Mich., and 0.26 grams of polymer from one of the Examples hereafter; i.e. 4 grams per liter concentration of stainblocker polymer solids in the application solution. The solution was adjusted to pH 2 with sodium bisulfate. The stainblocker application solution was applied to the carpet at 500% wet pick up. (The weight of carpet sample (grams)×500%=grams of stainblocker solution applied.) The stainblocker application solution was applied evenly to the wetted carpet samples in an amount equal to 500% of the dry carpet sample (500% wet pickup), and manually worked into the substrate until the substrate was fully saturated.

The stainblocker polymer was applied to the carpet sample at a rate of 2 weight percent polymer solids per weight of carpet, (i.e. 4/1000×500%=2%). A single layer of one or more of the treated carpet samples was placed on the bottom of a microwave-safe plastic tray (any microwave-safe plastic tray of adequate size may be used) with the pile side up. A few holes were punctured in the lid to prevent steam buildup, and the lid was placed on the plastic tray. Using a household microwave oven with a temperature probe (such as a General Electric model JVM1660, from General Electric, Schenectady N.Y.), the carpet was heated in the plastic tray at full power level until the temperature reached between 195±2° F. (91±1° C.) and the temperature held at that temperature for 2 minutes. The microwave oven temperature probe and internal temperature monitoring were used to control the temperature. The samples were then rinsed thoroughly with water. Most of the water in the carpet sample was removed by spin-drying with an extractor until the weight of water remaining in the carpeting was about 40% of the dry carpet weight. The carpet sample was then completely dried in an oven at between 160° F. and 180° F. (70° C. and 80° C.); typically for about 25 to 35 minutes. The carpet samples were allowed to cool completely, for at least 10-15 minutes, and to reach equilibrium with the room environment before proceeding with stain testing.

EXAMPLES

Unless otherwise indicated, all parts and percentages are by weight and temperatures in the Examples and Tests are in degrees Celsius. In the examples that follow, stain resistance was measured by the Test Methods described above.

Example 1

To a one liter four neck round bottom flask equipped with an overhead stirrer, condenser with nitrogen inlet, temperature probe and addition funnel, was added styrene maleic anhydride copolymer (SMA) (25 g, 124 mmol) 1000 flake and acetone (300 mL). 4-Aminosalicylic acid (0.95 grams, 6.2 mmol) and triethylamine, (0.78 gm, 1.2:1 molar ratio to 4-aminosalicylic acid, 7.7 mmol) were dissolved in 50 mL of deionized water and added slowly to the reaction, followed by refluxing for 3 hours. Rotary evaporation of the acetone gave the crude product in water (135 g, 19% solids). The above solution and sodium hydroxide (2 molar equivalents to SMA (9.9 grams) in 50 mL water) were heated in a 1 L round bottom flask at 70° C. for 3 hours. The solution was cooled, acidified, and filtered to yield 40.2 grams of light yellow powder. The product (4 grams) was dissolved in basic water by refluxing to give a solution (58.6 g, 6.8% solids). Theory C, 64.78; H, 6.27; N, 0.31. Found C, 63.36; H, 5.77; N, 0.34. The solution was applied to the light blue carpet substrate using the Application Method described above. The carpet was tested for resistance to staining with KOOL-AID and coffee according to Test Methods 1 and 2. Results are in Table 1.

Example 2

The process of Example 1 was employed using styrene maleic anhydride copolymer (SMA) 1000 (25 g, 124 mmol), 4-aminosalicylic acid (1.9 g, 12.4 mmol), and triethylamine (1.51 g). The solution of the resulting product prepared for testing had a solution wt. of 52.4 grams and 7.6% solids. Theory C, 64.70; H, 6.20; N, 0.59. Found: C, 60.91; H, 5.61; N, 0.71. The solution was applied to the light blue carpet substrate using the Application Method described above. The carpet was tested for resistance to staining with KOOL-AID and coffee according to Test Methods 1 and 2, and durability of stain resistance according to Test Method 3. Results are in Table 1.

Example 3

The process of Example 1 was employed using styrene maleic anhydride copolymer (SMA) 1000 (25 g, 124 mmol), triethylamine (4.56 g), and 4-aminosalicylic acid (5.76 g, 37.6 mmol). The solution of the resulting product prepared for testing had a solution wt. of 52.4 grams and 7.6% solids. Theory C, 64.41; H, 5.91; N, 1.75; Found C, 63.58; H, 5.650; N, 1.22. The solution was applied to the light blue carpet substrate using the Application Method described above. The carpet was tested for resistance to staining with KOOL-AID and coffee according to Test Methods 1 and 2. Results are in Table 1.

Example 4

The process of Example 1 was employed using styrene maleic anhydride copolymer (SMA) 1000 (15 g, 74.6 mmol), triethylamine (4.56 g), and 4-aminosalicylic acid (5.71 g, 37.3 mmol). The solution of the resulting product prepared for testing had a solution wt. of 59.1 grams and 6.8% solids. Theory: C, 64.24; H, 5.74; N, 2.42. Found: C, 64.00; H, 5.85; N, 1.60. The solution was applied to the light blue carpet substrate using the Application Method described above. The carpet was tested for resistance to staining with KOOL-AID and coffee according to Test Methods 1 and 2. Results are in Table 1.

Example 5

The process of Example 1 was employed using styrene maleic anhydride copolymer (SMA) 1000 (15 g, 74.6 mmol), triethylamine (9.06 g), and 4-aminosalicylic acid (11.42 g, 74.6 mmol). The solution of the resulting product prepared for testing had a solution wt. of 55.9 grams and 7.2% solids. Theory C, C, 63.86; H, 5.36; N, 3.92. Found C, 58.00; H, 5.44; N, 3.05. The solution was applied to the light blue carpet substrate using the Application Method described above. The carpet was tested for resistance to staining with KOOL-AID and coffee according to Test Methods 1 and 2. Results are in Table 1.

Example 6

The process of Example 1 was employed using styrene maleic anhydride copolymer (SMA) 1000 (13.2 g, 65.7 mmol), triethylamine (1.59 g), and recrystallized 4-aminosalicylic acid (2.00 g, 13.1 mmol). The solution of the product prepared for testing had 7.00% solids. The solution was applied to the light blue carpet substrate using the Application Method described above. The carpet was tested for resistance to staining with KOOL-AID and coffee according to Test Methods 1 and 2. Results are in Table 1.

TABLE 1

| Example | Amine, g | Triethyl Amine, g | Ratio $k/(h+i+j+k)$ | Ratio $h/(h+i+j+k)$ | Ratio of $(i+j)/(h+i+j+k)$ | KOOL AID - 24 hour | % Coffee Blocked |
|---|---|---|---|---|---|---|---|
| 1 | 0.95 | 0.78 | 0.5 | 0.025 | 0.475 | 9.5 | 30 |
| 2 | 1.9 | 1.51 | 0.5 | 0.05 | 0.45 | 10 | 28 |
| 3 | 5.76 | 4.56 | 0.5 | 0.15 | 0.35 | 10 | 26 |
| 4 | 5.71 | 4.56 | 0.5 | 0.25 | 0.25 | 10 | 21 |
| 5 | 11.42 | 9.06 | 0.5 | 0.5 | 0 | 10 | 14 |
| Untreated | | | | | | 1 | 0 |
| 6 | 2.00 | 1.59 | 0.5 | 0.1 | 0.4 | 10 | 34 |
| Untreated | | | | | | 1 | 0 |

The Examples 1-6 demonstrated the effect of various ratios of 4-aminosalicylic acid to styrene maleic anhydride copolymer used in the preparation of the copolymers of Formula 1 on the stain resist ability of the copolymer solution.

Example 7

To a one liter four-neck round bottom flask equipped with an overhead stirrer, condenser with nitrogen inlet, temperature probe and addition funnel, was added styrene maleic anhydride (SMA) (25 g, 124 mmol) 1000 flake and acetone (300 mL). 3-amino-4-hydroxybenzene-sulfonic acid hydrate (1.17 grams, 6.2 mmol) and triethylamine, (0.75 gm, 1.2:1 molar ratio to 3-amino-4-hydroxybenzene-sulfonic acid) were dissolved in 50 mL of deionized water and added slowly to the reaction, followed by refluxing for 3 hours. Rotary evaporation of the acetone gave the crude product in water (75 g, 35% solids). The above solution and sodium hydroxide (2 molar equivalents to SMA (9.9 grams) in 50 mL water) were heated in a 1 L round bottom flask at 70° C. for 3 hours. The solution was cooled, acidified, and filtered to yield 32.4 grams of light grey powder. The product (4 grams) was dissolved in basic water by refluxing to give a solution (60 g, 7.1% solids). The solution was applied to the light blue carpet substrate using the Application Method described above. The carpet was tested for resistance to staining with KOOL-AID and coffee using Test Methods 1 and 2. Results are in Table 2.

mmol). The solution of the resulting product prepared for testing had 6.2% solids. Theory: C, 54.95; H, 4.87; N, 3.56. Found: C, 61.36; H, 5.91; N, 2.47. The solution was applied to the light blue carpet substrate using the Application Method described above. The carpet was tested for resistance to staining with KOOL-AID and coffee using Test Methods 1 and 2. Results are in Table 2.

TABLE 2

| Example | Amine, g | Triethyl Amine, g | Ratio k/(h + i + j + k) | Ratio h/(h + i + j + k) | Ratio (i + j) (h + i + j + k) | KOOL AID - 24 hour | % Coffee Blocked |
|---|---|---|---|---|---|---|---|
| 7 | 1.17 | 0.75 | 0.5 | 0.03 | 0.47 | 8 | 31 |
| 8 | 2.35 | 1.51 | 0.5 | 0.06 | 0.44 | 9 | 31 |
| 9 | 5.71 | 3.66 | 0.5 | 0.15 | 0.35 | 6 | 21 |
| 10 | 6.62 | 4.25 | 0.5 | 0.3 | 0.2 | 7.5 | 18 |
| 11 | 9.46 | 6.07 | 0.5 | 0.5 | 0 | 6 | 16 |
| Untreated | | | | | | 1 | 0 | using the Application Method described above. The carpet was tested for resistance to staining with KOOL-AID and coffee using Test Methods 1 and 2. Results are in Table 2.

Example 8

The process of Example 7 was employed using styrene maleic anhydride copolymer (SMA) 1000 (20 g, 99.5 mmol), triethylamine (1.51 g, 14.9 mmol), and 3-amino-4-hydroxy-benzene-sulfonic acid hydrate (2.35 g, 12.4 mmol). The solution of the resulting product prepared for testing had 7.5% solids. The solution was applied to the light blue carpet substrate using the Application Method described above. The carpet was tested for resistance to staining with KOOL-AID and coffee using Test Methods 1 and 2. Results are in Table 2.

Example 9

The process of Example 7 was employed using styrene maleic anhydride copolymer (SMA) 1000 (20 g, 99.5 mmol), triethylamine (3.66 g, 36.2 mmol), and 3-amino-4-hydroxy-benzene-sulfonic acid hydrate (5.71 g, 30.2 mmol). The solution of the resulting product prepared for testing had 5.8% solids. The solution was applied to the light blue carpet substrate using the Application Method described above. The carpet was tested for resistance to staining with KOOL-AID and coffee using Test Methods 1 and 2. Results are in Table 2.

Example 10

The process of Example 7 was employed using styrene maleic anhydride copolymer (SMA) 1000 (14.1 g, 70 mmol), triethylamine (4.25 g, 42 mmol), and 3-amino-4-hydroxy-benzene-sulfonic acid hydrate (6.62 g, 35 mmol). The solution of the resulting product prepared for testing had 5.8% solids. The solution was applied to the light blue carpet substrate using the Application Method described above. The carpet was tested for resistance to staining with KOOL-AID and coffee using Test Methods 1 and 2. Results are in Table 2.

Example 11

The process of Example 7 was employed using styrene maleic anhydride copolymer (SMA) 1000 (10.1 g, 50.0 mmol), triethylamine (6.07 g, 60 mmol), and recrystallized 3-amino-4-hydroxybenzene-sulfonic acid hydrate (9.46 g, 50

The Examples 7-11 demonstrated the effect of use of 3-amino-4-hydroxybenzene-sulfonic acid hydrate in the preparation of copolymers of Formula 1 on the stain resist ability of the copolymer solution.

Example 12

The process of Example 7 was employed using 1-octene/maleic anhydride copolymer (OMA) (10.5 g, 50.0 mmol), triethylamine (6.07 g, 60 mmol), and recrystallized 3-amino-4-hydroxybenzene-sulfonic acid hydrate (9.46 g, 50 mmol). The solution of the resulting product prepared for testing had 9.3% solids. The solution was applied to the light blue carpet substrate using the Application Method described above. The carpet was tested for resistance to staining with KOOL-AID and coffee using Test Methods 1 and 2. Results are in Table 3.

Example 13

The process of Example 7 was employed using 1-octene/maleic anhydride copolymer (OMA) (10.5 g, 50.0 mmol), triethylamine (0.06 g, 0.6 mmol), and recrystallized 3-amino-4-hydroxybenzene-sulfonic acid hydrate (0.095 g, 0.5 mmol). The solution of the resulting product prepared for testing had 9.2% solids. The solution was applied to the light blue carpet substrate using the Application Method described above. The carpet was tested for resistance to staining with KOOL-AID and coffee using Test Methods 1 and 2. Results are in Table 3.

Example 14

The process of Example 7 was employed using styrene maleic anhydride copolymer (SMA) 1000 (10.1 g, 50.0 mmol), triethylamine (0.06 g, 0.6 mmol), and recrystallized 3-amino-4-hydroxybenzene-sulfonic acid hydrate (0.095 g, 0.5 mmol). The solution of the resulting product prepared for testing had 10.1% solids. The solution was applied to the light blue carpet substrate using the Application Method described above. The carpet was tested for resistance to staining with KOOL-AID and coffee using Test Methods 1 and 2. Results are in Table 3.

TABLE 3

| Example | Amine, g | Triethyl Amine, g | Ratio k/(h + i + j + k) | Ratio h/(h + i + j + k) | Ratio (i + j)/(h + i + j + k) | KOOL-AID 24 hour | % Coffee Blocked |
| --- | --- | --- | --- | --- | --- | --- | --- |
| 12 | 9.46 | 6.07 | 0.41 | 0.5 | 0.09 | 2 | 55 |
| 13 | 0.095 | 0.06 | 0.41 | 0.005 | 0.585 | 9 | 15 |
| 14 | 0.095 | 0.06 | 0.5 | 0.005 | 0.495 | 4 | 23 |
| Untreated | | | | | | 1 | 0 |

The Example 12 showed an improved performance in coffee blocking when octene maleic anhydride copolymer is used in place of styrene maleic anhydride copolymer in the copolymer of Formula 1. Examples 13 and 14 demonstrated that with a low level of less than 1% amino acid incorporation into the copolymer of Formula 1, better stain resistance is achieved than with an untreated carpet.

Examples 15-24

The process of Example 7 was employed using octene maleic anhydride copolymer (10.5 g, 50.0 mmol) for Examples 15-19, and styrene maleic anhydride copolymer (10.1g, 50.0 mmol) for Examples 20-24, and triethylamine and 4-aminobutyric acid in amounts shown in Table 4. A solution of the resulting product was prepared and applied to the light blue carpet substrate using the Application Method described above. The carpet was treated for resistance to staining with KOOL-AID and coffee using Test Methods 1 and 2. Results are in Table 4.

used) were combined in a mortar and ground with a pestle until all of the solids were thoroughly mixed. The mixture was placed in a Pyrex beaker and heated in a (1000 watt General Electric Model JVM1660WB) microwave oven. After heating for five minutes at HIGH power, a brief period of stirring or regrinding of the starting materials was conducted and the five minute heating cycle repeated. The progress of the reaction was monitored by disappearance of the amine using TLC. Baker-flex TLC plates coated with Silica Gel IB-F with UV fluorescent indicator were purchased from VWR and oven dried at 80° C. prior to use. Five-minute heating cycles were repeated until the consumption of the amine ceased. A solution of the resulting product was prepared and was applied to the beige carpet substrate using the Application Method described above. The treated substrate was tested for resistance to staining with KOOL-AID and coffee using Test Methods 1 and 2. Results are in Table 5.

TABLE 4

| Example | Amine, g | Triethyl Amine, g | Ratio k/(h + i + j + k) | Ratio h/(h + i + j + k) | Ratio (i + j)/(h + i + j + k) | KOOL-AID - 24 hour | % Coffee Blocked |
| --- | --- | --- | --- | --- | --- | --- | --- |
| 15 | 0.95 | 0.23 | 0.41 | 0.09 | 0.5 | 9 | 25 |
| 16 | 0.14 | 0.46 | 0.4 | 0.01 | 0.59 | 9 | 27 |
| 17 | 0.28 | 1.13 | 0.4 | 0.03 | 0.57 | 7 | 24 |
| 18 | 0.68 | 1.71 | 0.4 | 0.07 | 0.53 | 6.5 | 23 |
| 19 | 1.03 | 2.52 | 0.4 | 0.1 | 0.5 | 6 | 23 |
| 20 | 0.14 | 0.49 | 0.5 | 0.01 | 0.49 | 9.5 | 28 |
| 21 | 0.28 | 0.99 | 0.5 | 0.03 | 0.47 | 9.5 | 27 |
| 22 | 0.71 | 2.51 | 0.5 | 0.07 | 0.43 | 9 | 27 |
| 23 | 1.01 | 3.57 | 0.5 | 0.1 | 0.4 | 9 | 19 |
| 24 | 1.29 | 4.56 | 0.5 | 0.13 | 0.47 | 3 | 15 |
| Untreated Carpet Control | | | | | | 1 | 0 |

Examples 15-24 demonstrated use of various amounts of 4-aminobutyric acid in the copolymer of Formula 1 with each of octene maleic anhydride and styrene maleic anhydride. Generally excellent resistance to staining by coffee and KOOL-AID was demonstrated.

Example 25

An octene maleic anhydride copolymer (3 g), glycine (0.22 g), and inorganic base (optional and as shown in Table 5 when Examples 26-36

The process of Example 25 was employed to prepare the copolymers of Formula 1 using octene maleic anhydride copolymer (3 g) and an amine as shown in Table 5. NaHCO$_3$ was added as indicated in Table 5. A solution of the copolymer was prepared and applied to the beige carpet substrate using the Application Method described above. The treated substrate was tested for resistance to staining with KOOL-AID and coffee using Test Methods 1 and 2. Results are in Table 5.

TABLE 5

| Example | Amine, g | NaHCO$_3$, g | Ratio k/(h + i + j + k) | Ratio h/(h + i + j + k) | Ratio (i + j)/(h + i + j + k) | KOOL-AID - 24 hour | % Coffee Blocked |
|---|---|---|---|---|---|---|---|
| 25 | Glycine, 0.76 | 3.0 | 0.41 | 0.35 | 0.24 | 7 | 28 |
| 26 | Benzylamine, 1.14 | 3.0 | 0.41 | 0.37 | 0.22 | 9 | 35 |
| 27 | Isopropyl amine, 0.50 | 3.0 | 0.41 | 0.30 | 0.30 | 10 | 30 |
| 28 | Pentafluoroaniline, 2.16 | 0 | 0.41 | 0.41 | 0.18 | 9 | 21 |
| 29 | Pentafluoroaniline, 3.08 | 0 | 0.41 | 0.59 | 0 | 9 | 22 |
| 30 | Taurine, 2.11 | 3.0 | 0.41 | 0.59 | 0 | 1 | 11 |
| 31 | Amino methane sulfonic acid, 1.87 | 3.0 | 0.41 | 0.59 | 0 | 3 | 28 |
| 32 | Sulfanilic acid, 2.92 | 3.0 | 0.41 | 0.59 | 0 | 8 | 40 |
| 33 | 5-aminosalicylic acid, 2.58 | 3.0 | 0.41 | 0.59 | 0 | 10 | — |
| 34 | 4-aminophenyl sulfone, 0.42 | 3.0 | 0.41 | 0.06 | 0.53 | 8 | 36 |
| 35 | Glutamic acid, 0.50 | 3.0 | 0.41 | 0.12 | 0.47 | 9.5 | 36 |
| 36 | n-hexylamine, 0.17 | 3.0 | 0.41 | 0.06 | 0.53 | 9 | 10 |
| Untreated Carpet Control | | | | | | 1 | 0 |

Examples 25-36 demonstrated use of various amines with octene maleic anhydride copolymer in the copolymer of Formula 1, and generally provided excellent resistance to staining by coffee and KOOL-AID. These examples also demonstrated use of a microwave oven technique in conducting the polymerization reaction.

Examples 37-48

The process of Example 25 was employed to prepare copolymers of Formula 1 using styrene maleic anhydride copolymer (3 g), and for Example 48 using ethylene maleic anhydride copolymer (3 g), with an amine as listed in Table 6. A solution of the resulting copolymer was prepared and applied to the beige carpet substrate using the Application Method described above. The treated substrate was tested for resistance to staining with KOOL-AID and coffee using Test Methods 1 and 2. Results are in Table 6.

TABLE 6

| Example | Amine, g | NaHCO$_3$, g | Ratio k/(h + i + j + k) | Ratio h/(h + i + j + k) | Ratio (i + j)/(h + i + j + k) | KOOL-AID - 24 hour | % Coffee Blocked |
|---|---|---|---|---|---|---|---|
| 37 | Pentafluoro-aniline, 2.45 | 0 | 0.5 | 0.45 | 0.05 | 9.5 | 13 |
| 38 | Pentafluoro-aniline, 1.90 | 0 | 0.5 | 0.35 | 0.15 | 9 | 21 |
| 39 | Glutamic acid, 1.09 | 3 | 0.5 | 0.25 | 0.25 | 10 | 34 |
| 40 | 4-aminosalicylic acid, 0.91 | 3 | 0.5 | 0.20 | 0.30 | 10 | 6 |
| 41 | Sec-butylamine, 0.54 | 3 | 0.5 | 0.25 | 0.25 | 9.5 | 19 |
| 42 | 3-aminopropane-sulfonic acid, 1.03 | 3 | 0.5 | 0.25 | 0.25 | 7 | 31 |
| 43 | Sulfanilic acid, 1.54 | 3 | 0.5 | 0.30 | 0.20 | 9.5 | 27 |
| 44 | Morpholine, 0.13 | 3 | 0.5 | 0.05 | 0.45 | 9 | — |
| 45 | Pyrrolidine, 0.11 | 3 | 0.5 | 0.05 | 0.45 | 8 | — |
| 46 | Diethanol amine, 0.16 | 3 | 0.5 | 0.05 | 0.45 | 7 | — |
| 47 | Bis(2-methoxyethyl) amine, 0.20 | 3 | 0.5 | 0.05 | 0.45 | 10 | 11 |
| 48 | Benzyl amine, 1.02 | 3 | 0.5 | 0.20 | 0.30 | 8 | 17 |
| Untreated Carpet Control | | | | | | 1 | 0 |

Examples 37-47 demonstrated that use of various amines with styrene maleic anhydride copolymer in the copolymer of Formula 1 provided excellent resistance to coffee and KOOL-AID staining. Example 48 demonstrated use of benzyl amine with ethylene maleic anhydride copolymer in the copolymer of Formula 1 also provided excellent stain resistance to coffee and KOOL-AID.

What is claimed is:

1. A method for imparting resistance to staining to a fibrous substrate comprising contacting said fibrous substrate with a copolymer comprising the monomers of Formula I

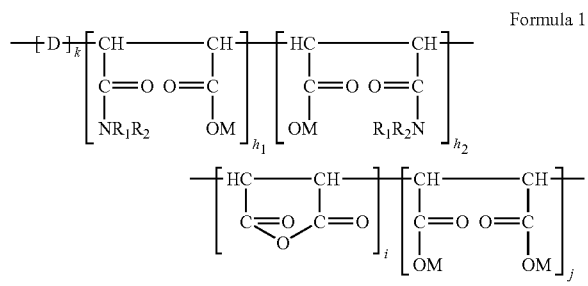

Formula 1 wherein
D is at least one vinyl monomer selected from the group consisting of aryl olefin, alpha olefin and diene,
each M is independently H, Ca, Mg, Al, Na, or K,
each $R_1$ is independently H, $C_1$-$C_6$ alkyl, or $C_1$-$C_6$ hydroxyalkyl, each $R_2$ is independently $C_6F_5$, $(CH_2)_m C_6H_5$, $(CH_2)_n SO_3H$, $C_6H_4SO_3H$, $CH(CH_3)CH_2CH_3$, or $R_3COOH$ wherein m is 1, n is 1 or 2, and $R_3$ is linear or branched $C_1$-$C_{12}$ alkyl,
or $R_1$ and $R_2$ are linked together to form a morpholino or pyrrolidino ring,
$h_1+h_2$ is h, h is a positive integer,
k is zero or a positive integer,
i and j are each independently zero or a positive integer,
provided that the total of 1) h÷(k+h+i+j) is from about 0.005 to about 0.7, 2) k÷(k+h+i+j) is from about 0.3 to about 0.6, 3) [i+j]÷(k+h+i+j) is 0 to about 0.6, and provided that the sum of 1)+2)+3) is 1.0,
said monomers occurring in any sequence.

2. The method of claim 1 wherein D is an aryl olefin, alpha olefin, or diene.

3. The method of claim 1 wherein each M is independently H, Na or K.

4. The method of claim 1 wherein Formula 1 is in the form of a dispersion or solution.

5. The method of claim 1 wherein one of i or j is zero.

6. The method of claim 1 wherein the copolymer of Formula 1 is combined with at least one of an agent providing a surface effect selected from the group consisting of no iron, easy to iron, shrinkage control, wrinkle free, permanent press, moisture control, softness, strength, anti-slip, anti-static, anti-snag, anti-pill, stain repellency, stain release, soil repellency, soil release, water repellency, oil repellency, odor control, antimicrobial, and sun protection.

7. The method of claim 1 wherein the copolymer of Formula 1 is combined with at least one of surfactants, blocked isocyanates, pH adjusters, cross linkers, wetting agents, hydrocarbon extenders, and wax extenders.

8. The method of claim 1 wherein the contacting is by means of spray, foam flex-nip, nip, pad, kiss-roll, beck, skein, winch, brush, roll, spray, immersion, liquid injection, and overflow flood.

9. The method of claim 1 wherein the staining is by coffee or by a red acid dye stain.

* * * * *